US012715007B2

(12) United States Patent
Seok et al.

(10) Patent No.: US 12,715,007 B2
(45) Date of Patent: Aug. 25, 2026

(54) DIELECTRIC PARTICLE SORTING APPARATUS

(71) Applicant: KOREA INSTITUTE OF FUSION ENERGY, Daejeon (KR)

(72) Inventors: Dong Chan Seok, Gunsan-si (KR); Soo Ouk Jang, Sejong (KR); Yong Sup Choi, Gunsan-si (KR); Tai Hyeop Lho, Seoul (KR); Yong Ho Jung, Seongnam-si (KR); Seung Ryul Yoo, Daejeon (KR)

(73) Assignee: KOREA INSTITUTE OF FUSION ENERGY, Daejeon (KR)

( * ) Notice: Subject to any disclaimer, the term of this patent is extended or adjusted under 35 U.S.C. 154(b) by 0 days.

(21) Appl. No.: 18/846,478

(22) PCT Filed: Mar. 23, 2023

(86) PCT No.: PCT/KR2023/003850
§ 371 (c)(1),
(2) Date: Sep. 12, 2024

(87) PCT Pub. No.: WO2023/182824
PCT Pub. Date: Sep. 28, 2023

(65) Prior Publication Data
US 2025/0205713 A1 Jun. 26, 2025

(30) Foreign Application Priority Data
Mar. 23, 2022 (KR) ........................ 10-2022-0036099

(51) Int. Cl.
*B03C 7/02* (2006.01)
*B03C 7/00* (2006.01)

(52) U.S. Cl.
CPC .............. *B03C 7/023* (2013.01); *B03C 7/003* (2013.01)

(58) Field of Classification Search
CPC .. B03C 3/45; B03C 7/02; B03C 7/032; B03C 7/026
(Continued)

(56) References Cited

U.S. PATENT DOCUMENTS 4,874,507 A 10/1989 Whitlock
5,454,472 A 10/1995 Benecke et al.
(Continued)

FOREIGN PATENT DOCUMENTS

JP H0724361 1/1995
JP 2007117873 5/2007
KR 100247532 5/2000

OTHER PUBLICATIONS

Seiji; Baba, "Static Powder Separation and Classification Apparatus" (English Translation), Jan. 27, 1995, worldwide.espacenet.com (Year: 1995).*

(Continued)

*Primary Examiner* — Molly K Devine
(74) *Attorney, Agent, or Firm* — NORTON ROSE FULBRIGHT US LLP

(57) ABSTRACT

The present invention provides a dielectric particle sorting apparatus. The dielectric particle sorting apparatus comprises: a chamber; a bottom electrode in the chamber; and a top electrode disposed at the top of the chamber so as to be spaced from the bottom electrode therein, wherein dielectric particles are positioned on the bottom electrode so that, when an alternating-current electric field is applied, the dielectric particles are electrified to be induced to flow upward, and thus the dielectric particles are sorted, and voltage and frequency are controlled so that the dielectric particles are controlled by particle size, weight, density, permittivity or surface area.

12 Claims, 12 Drawing Sheets

(58) Field of Classification Search
USPC ........................................... 209/127.1, 129
See application file for complete search history.

(56) References Cited

U.S. PATENT DOCUMENTS

| | | | | |
|---|---|---|---|---|
| 5,542,559 | A * | 8/1996 | Kawakami .......... | H01J 37/3244<br>156/345.47 |
| 2004/0035758 | A1 * | 2/2004 | Yoshiyama ............... | B03C 7/04<br>209/129 |

OTHER PUBLICATIONS

English translation of International Search Report for PCT Application No. PCT/KR2023/003850 dated Jun. 28, 2023.

* cited by examiner

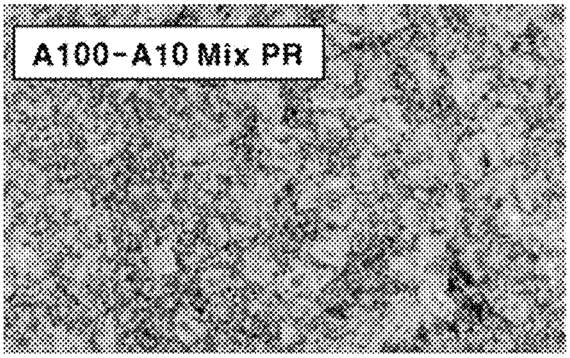

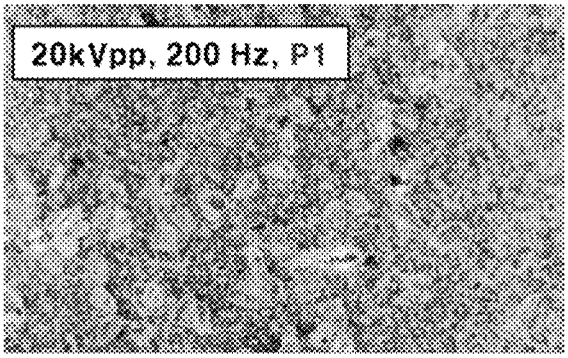

The powders P1 accumulated under sorting conditions of the voltage 20 kVpp and the frequency 200 Hz (the mixed powders having a lower content of A100)

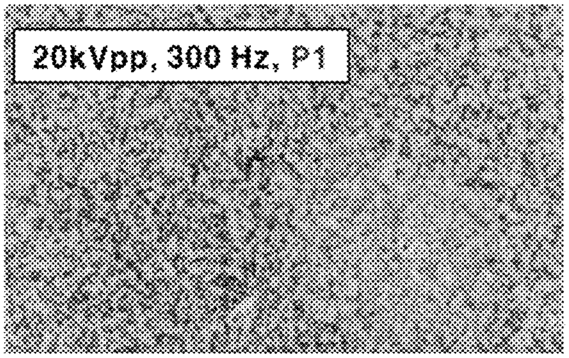

The powders P1 accumulated under sorting conditions of the voltage 20 kVpp and the frequency 300 Hz (only A10 being accumulated thereon)

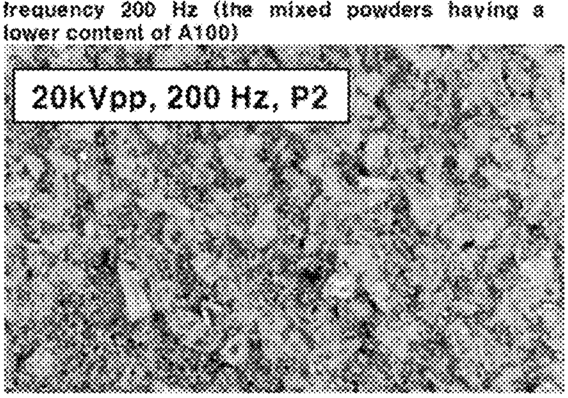

The powders P2 remaining when the powders are sorted under conditions of the voltage 20 kVpp and the frequency 200 Hz (the mixed powders having a higher content of A100)

Fig 10

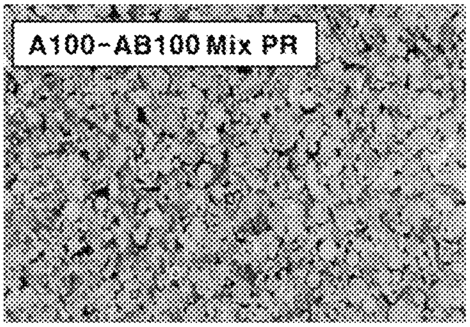

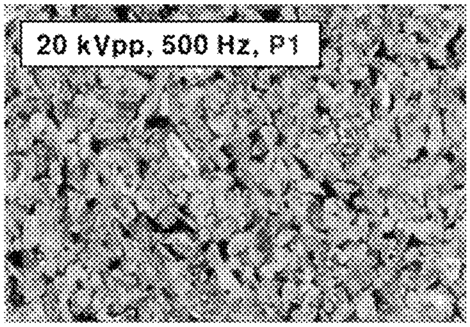

The powders P1 accumulated under sorting conditions of the voltage 20 kVpp and the frequency 500 Hz (mixed powders of AB100 having smaller diameter and A100 having lower sphericity)

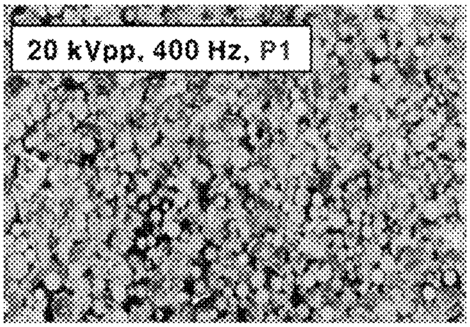

The powders P1 accumulated under sorting conditions of the voltage 20 kVpp and the frequency 400 Hz (mixed powders of AB100 having smaller diameter and A100 having higher sphericity)

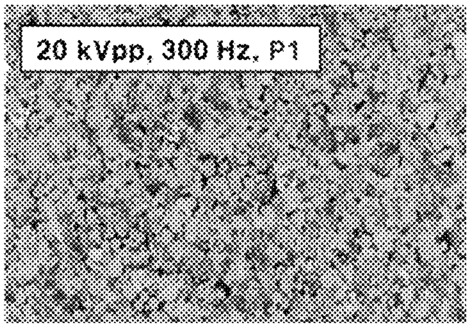

The powders P1 accumulated under sorting conditions of the voltage 20 kVpp and the frequency 300 Hz (mixed powders of AB100 having smaller diameter and A100 having higher sphericity)

Fig 12

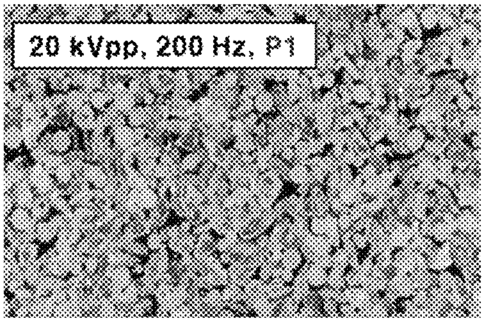

The powders P1 accumulated under sorting conditions of the voltage 20 kVpp and the frequency 200 Hz (mixed powders of AB100 having larger diameter and A100 having higher sphericity)

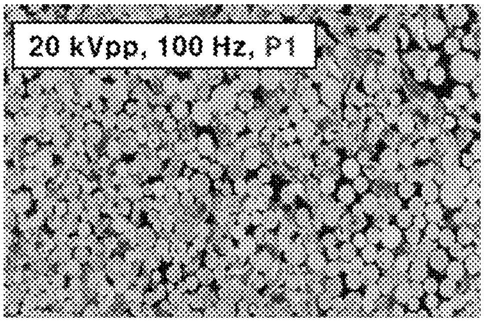

The powders P1 accumulated under sorting conditions of the voltage 20 kVpp and the frequency 500 Hz (mixed powders of AB100 having larger diameter and A100 having higher sphericity)

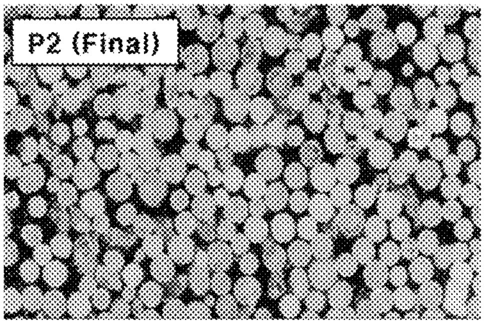

The powders P2 accumulated after terminating the sorting experiment (AB100 particles having a large particle diameter)

Fig 13

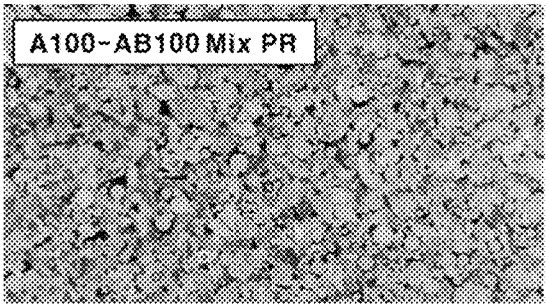

A100+AB100 mixed powders

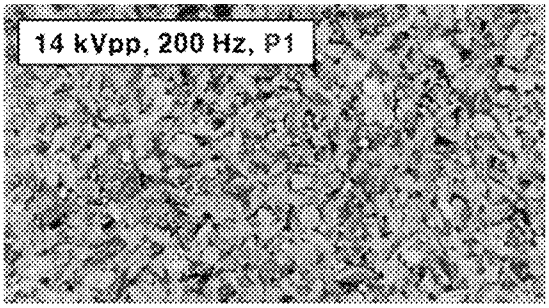

The powders P1 accumulated under sorting conditions of the voltage 14 kVpp and the frequency 200 Hz (A100 with irregular shape and AB100 with very small particle size)

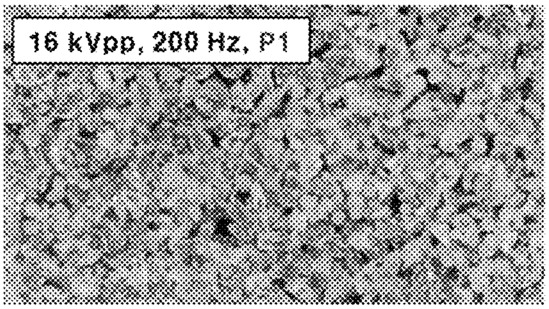

The powders P1 accumulated under sorting conditions of the voltage 16 kVpp and the frequency 200 Hz (A100 with irregular shape and AB100 with middle particle size)

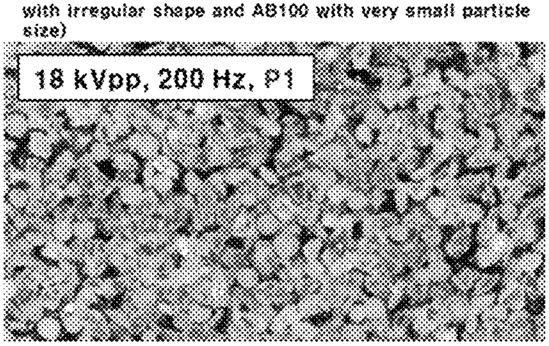

The powders P1 accumulated under sorting conditions of the voltage 18 kVpp and the frequency 200 Hz (A100 with less irregular shape and AB100 with middle particle size)

Fig 14

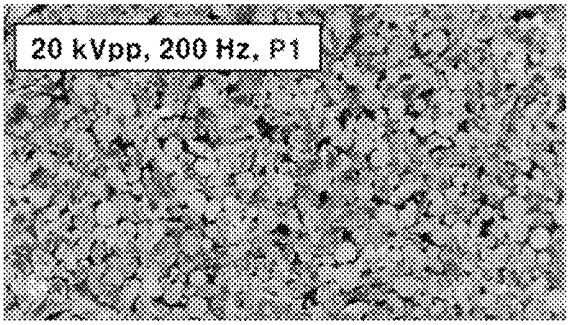

The powders P1 accumulated under sorting conditions of the voltage 20 kVpp and the frequency 200 Hz (A100 with less irregular shape and AB100 with middle particle size)

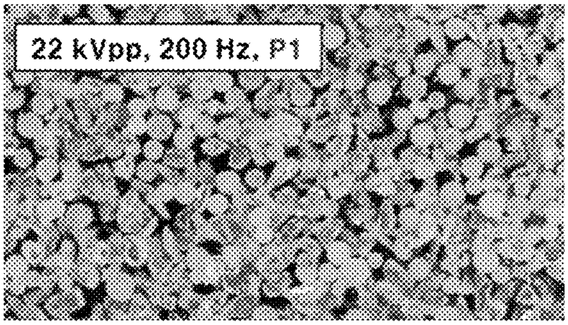

The powders P1 accumulated under sorting conditions of the voltage 22 kVpp and the frequency 200 Hz (A100 with less irregular shape and AB100 with larger particle size)

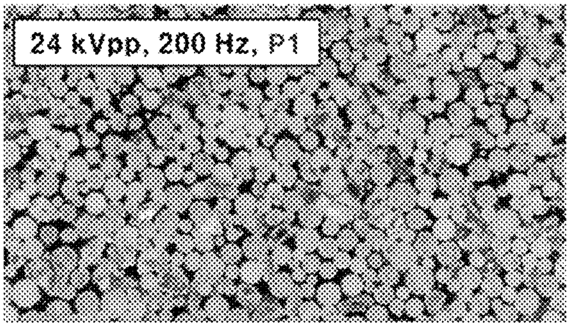

The powders P1 accumulated under sorting conditions of the voltage 24 kVpp and the frequency 200 Hz (mixed powders having higher content of AB100 with larger particle size)

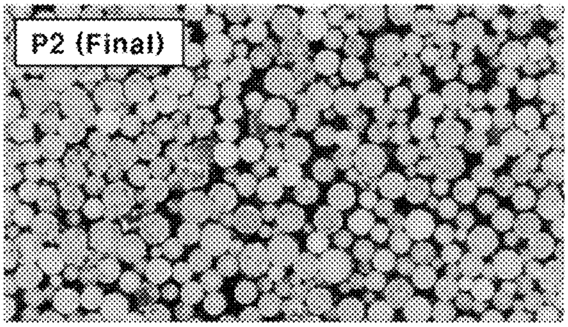

The powders P2 accumulated after terminating the sorting experiment (AB100 particles having a large particle diameter)

Fig 15

DIELECTRIC PARTICLE SORTING APPARATUS

CROSS-REFERENCE TO RELATED APPLICATIONS

The present application is a national phase application under 35 U.S.C. § 371 of International Application PCT/KR2023/003850 filed Mar. 23, 2023, which claims the benefit of priority to Korean Patent Application 10-2022-0036099 filed Mar. 23, 2022. The contents of each application are incorporated herein by reference in their entirety.

FIELD

The present disclosure relates to an apparatus for sorting dielectric powders easily based on a particle diameter, a particle weight, a particle density, a permittivity, or a surface area.

DESCRIPTION OF RELATED ART

The sorting of powders is widely used in industries such as paint, pigment, ink, polishing, and the like. In general, the powder sorting may sort the dielectric powders using a difference between magnitudes of gravity and centrifugal forces or inertial forces acting based on a size and a mass of the powder. In addition, the powder may be sorted according to an action direction of a force applied from an outside and a flow direction of the particle. For example, when inducing the downward flow of the dielectric powders from the top to the bottom in the inner space of the chamber, air flow is applied to a middle of the chamber in a direction perpendicular to the vertical direction, such that the heavy powder subjected to the large gravity force may sink, while the light powder subjected to the low gravity force may be moved to another space along the flow of air. In this way, the dielectric powders may be sorted.

However, these methods are disadvantageous in that it takes time to sort the powders. Further, there is a problem in that it is difficult to sort small fine particles. Accordingly, the present disclosure provides a device capable of easily sorting the dielectric powders within a short time using an electric field of alternating current.

DISCLOSURE

Technical Purpose

A purpose of the present disclosure is to provide an apparatus for sorting dielectric powders, in which the apparatus is capable of easily sorting mixed dielectric powders based on a particle diameter, a particle type, and a particle shape, by inducing flow of charged dielectric powders using a force of $q \cdot E$ under an electric field of alternating current.

Technical Solution

FIG. 1 is a view illustrating a structure of an apparatus for sorting dielectric powders according to the present disclosure.

Referring to FIG. 1, an apparatus for sorting dielectric powders for achieving the purpose of the present disclosure comprises: a chamber; a lower electrode received in an inner space of the chamber; an upper electrode received in the inner space of the chamber and spaced apart from the lower electrode and disposed at an upper end of the inner space of the chamber; a first separation layer positioned between the upper electrode and the lower electrode received in the inner space of the chamber, wherein the first separation layer only partially overlaps each of the upper electrode and the lower electrode vertically; and a power applying means configured to generate an electric field of alternating current in an area between the lower electrode and the upper electrode, wherein the dielectric powders are positioned between the lower electrode and the first separation layer.

In the present disclosure, when an electric field of alternating current is generated, a higher electric field may be generated in an inside of the dielectric powders layer than in an outside out of the dielectric powders layer, and thus, the gas discharge is more easily generated therein to electrically charge the dielectric powders particles. The charged dielectric powders particles may be subjected to a force to allow the particles to rise up under the electric field and in the inner space of the chamber and thus may easily flow upwardly within the inner space of the chamber. In this regard, the dielectric powders may be subject to the force inducing the upward flow which may vary due to the size, density, and shape of the dielectric powder. Therefore, the size, the density, and the space of the dielectric powders accumulated on the first separation layer and the size, the density, and the space of the dielectric powders accumulated on the lower electrode after the electric field has been applied may be different from each other. In the present disclosure, the dielectric powders may be sorted using the difference.

The magnitude of the voltage and the frequency of the alternating current applied to the apparatus for sorting the dielectric powders of the present disclosure may be controlled to control the upward flow of the dielectric powders. Therefore, according to the present disclosure, the dielectric powders may be easily sorted based on a sorting criterion including a diameter, a weight, a density, a permittivity, or a surface area of the particle, or the like using the sorting apparatus. In this regard, a detailed description thereof will be described with reference to FIGS. 2 to 15 and embodiments as set forth below.

In the present disclosure, the apparatus may be configured to control the characteristics of plasma generation in the outside out of the fluid powder layer and in the fluid powder layer under a given voltage condition based on the gas which has been supplied or is being supplied into the chamber when the electric field of the alternating current is applied. The gas which has been supplied or is being supplied into the chamber when the electric field of the alternating current is applied may be air. When the combustible dielectric powders are to be sorted, a gas containing no oxygen may be used. In the present disclosure, the gas which has been supplied or is being supplied to the inner space of the chamber when the electric field of the alternating current is applied is not specifically limited in terms of a type of a material thereof.

In the present disclosure, the dielectric powder refers to an insulating powder that may be negatively polarized at one side thereof and be positively polarized at the other side thereof according to the direction of the electric field under an electric field. The dielectric powder may be made of a material which may store excessive charges in a form of electrons (−) or holes (+) on the surface thereof to have a net charge via the electrically charging step (for example, application of plasma through application of an electric field, photoelectric effect by ultraviolet irradiation, etc.) as described below. In an embodiment, the dielectric powders may be charged dielectric powders. The charged dielectric powder may have a net charge on the surface (excessive charges stored on the powder other than polarization charges charged negatively and positively which are offset against each other) compared to the uncharged dielectric powder, and thus may be subjected to the force inducing the upward flow thereof so as to be away from the dielectric powder layer. Preferably, the dielectric powder may be a dielectric powder having a size of several nanometers to several thousands of micrometers.

In an embodiment, before the electric field of the alternating current is generated, the electrically charging step of additionally electrically charging the dielectric powders in the inner space of the chamber may be performed. For example, the electrically charging step may be performed through application of the electric field, irradiation of UV, or generation of plasma for dielectrophoresis of the dielectric powders.

In an embodiment, the electrically charging step may include filling the chamber with a first gas and then applying a voltage so that plasma is generated in a dielectric powder layer, and then filling the chamber with a second gas, wherein the first gas has a discharge starting voltage lower than a discharge starting voltage of the second gas. For example, the electrically charging step may be performed by filling the chamber with helium and then applying the voltage to the electrodes so that plasma is generated in the dielectric powder layer, thereby electrically charging the dielectric powders, and then filling the chamber with air or SF6 having a higher discharge starting voltage than that of helium.

In the present disclosure, the upper and lower electrodes may alternately act as a power electrode and a ground electrode. For example, when the lower electrode acts as the power electrode, the upper electrode may act as the ground electrode. When the lower electrode acts as the ground electrode, the upper electrode may act as the power electrode.

The apparatus for sorting the dielectric powders may further comprise a second separation layer received in the inner space of the chamber and positioned between the upper electrode and the lower electrode, wherein the second separation layer only partially overlaps each of the upper electrode and the lower electrode, wherein a vertical level of the second separation layer is different from a vertical level of the first separation layer. When the electric field of alternating current is applied to the apparatus B for sorting the dielectric powders, the dielectric powders may have ascending flow forces varying based on sizes, densities, surface areas, and the like thereof. Thus, the dielectric powders having the different sizes, densities, surface areas, and the like may be respectively accumulated on the first separation layer and the second separation layer, based on the sorting criterion.

In the present disclosure, each of the first separation layer and the second separation layer may be made of a dielectric material. A distance between the first separation layer and the second separation layer, and a distance between the second separation layer and the upper electrode may be easily controlled by a user. When the distance between the lower electrode and each of the first and second separation layers is too large, a voltage level higher than as required should be applied. For this reason, the distance between each of the first and second separation layers from the lower electrode may be smaller than about 40 mm.

Each of the apparatuses A and B for sorting the dielectric powders of the present disclosure may further include a dielectric substrate stacked on an upper surface of the lower electrode. When a high voltage is applied across the upper and lower electrodes without the dielectric substrate, an arc and a spark discharge mag be generated, such that it is difficult to apply a target high electric field. Further, charged particles flow only through an arc and a spark discharge, such that there is a problem in that it is impossible to impart the net charge to the powder particles. Thus, the dielectric powders sorting apparatus of the present disclosure may further include the dielectric substrate stacked on the upper surface of the lower electrode.

According to an aspect of the present disclosure, there is provided an apparatus C for sorting the dielectric powders, the apparatus comprising: a chamber; a lower electrode received in an inner space of the chamber; an upper electrode received in the inner space of the chamber, wherein the upper electrode is positioned between an upper end of a main body of the chamber and the lower electrode so as to divide the inner space of the chamber into upper and lower portions, wherein the upper electrode only partially overlaps the lower electrode vertically; and a power applying means configured to applying alternating current power to the lower electrode and the upper electrode so that an electric field of the alternating current is generated between the lower electrode and the upper electrode, wherein the dielectric powders are positioned between the lower electrode and the upper electrode.

Since a configuration of the apparatus C for sorting the dielectric powders is substantially the same as the configuration of each of the apparatuses A and B for sorting the dielectric powders as described above with reference to FIG. 1, duplicate detailed descriptions thereof will be omitted, and differences therebetween will be mainly described below.

When the electric field of alternating current is applied to the apparatus C for sorting the dielectric powders, the dielectric powders accumulated on the upper electrode is no longer exposed to the electric field, and thus may not flow and thus may be sorted according to the sorting criteria. Further, the dielectric powders colliding with the lower surface of the upper electrode may flow upwardly and downwardly repeatedly under the electric field of the alternating current and thus may be diffused and evenly distributed in the inner space of the chamber, and eventually, the dielectric powders may be accumulated on the upper electrode, and thus may be sorted. In general, since the frequency of the applied voltage is about hundreds of Hz, the dielectric powders may flow upwardly and downwardly repeatedly under the electric field of the alternating current hundreds of times per second. Thus, according to the sorting criterion, the dielectric powders may be accumulated on the upper electrode within a few seconds, and thus the dielectric powders may be easily sorted within a short time.

The upper space of the inner space of the chamber defined on top of the upper electrode may have a vertical dimension sized such that the dielectric powders can flow in the upper space.

In the present disclosure, the apparatus C for sorting the dielectric powders may further include a first dielectric substrate upwardly spaced apart from the upper electrode and disposed at an upper end of the inner space of the chamber, wherein the dielectric powders can flow in the space between the first dielectric substrate and the upper electrode; and a second dielectric substrate stacked on an upper surface of the lower electrode. The first dielectric substrate may prevent the dielectric powders having passed by the upper electrode upwardly from being removed from the sorting apparatus, and may isolate any gas in the sorting apparatus from external air.

In each of the sorting apparatuses A and B, the dielectric substrate may be disposed on the upper surface of the lower electrode.

In the present disclosure, even when the dielectric powders flow upwardly and collides with the upper end of the chamber, and thus drop down therefrom, the dielectric powders may drop down and may be accumulated on the first separation layer, the second separation layer, and the upper electrode provided as the sorting means, and thus may be sorted.

In the present disclosure, the supply of the dielectric powders and collection of the sorted dielectric powders may be performed using gas flow, mechanical vibration, and paddle.

Technical Effect

According to the present disclosure, the voltage and the frequency may be controlled in consideration of the characteristics of the dielectric powders particles, such that the mixed dielectric powders may be sorted in a time range of several seconds to several minutes, based on a diameter, weight, density, permittivity, or surface area of the particle.

BRIEF DESCRIPTION OF THE DRAWINGS

FIG. 10 shows images of the dielectric powders sorted through Example 1 of the present disclosure.

FIGS. 12 and 13 show images of the dielectric powders sorted through Example 2 of the present disclosure.

FIGS. 14 and 15 show images of the dielectric powders sorted through Example 3 of the present disclosure.

DETAILED DESCRIPTIONS

Figure 1:
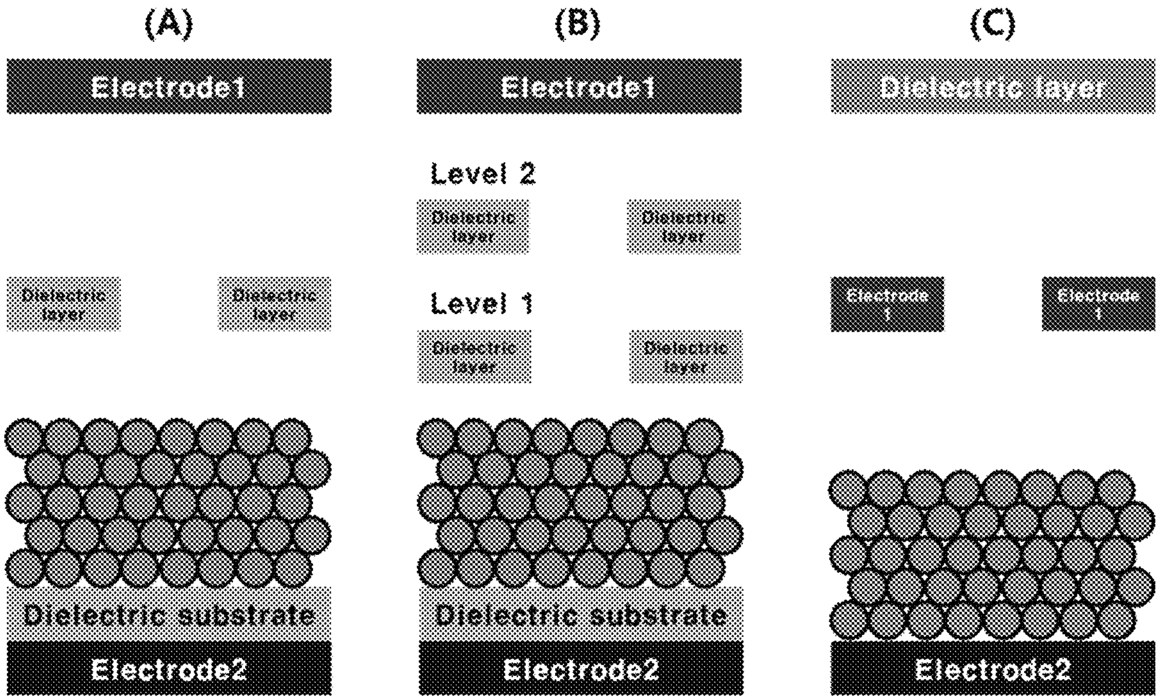
FIG. 1 is a view illustrating a structure of an apparatus for sorting dielectric powders according to the present disclosure.

Hereinafter, embodiments of the present disclosure will be described in detail with reference to the accompanying drawings. The present disclosure may have various changes and may have various forms, and specific embodiments are illustrated in the drawings and will be described in detail herein. However, it should be understood that the present disclosure is not limited to the specific disclosed forms, but includes all modifications, equivalents, and substitutes included in the spirit and technical scope of the present disclosure. In describing the drawings, similar reference numerals are used for similar components.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
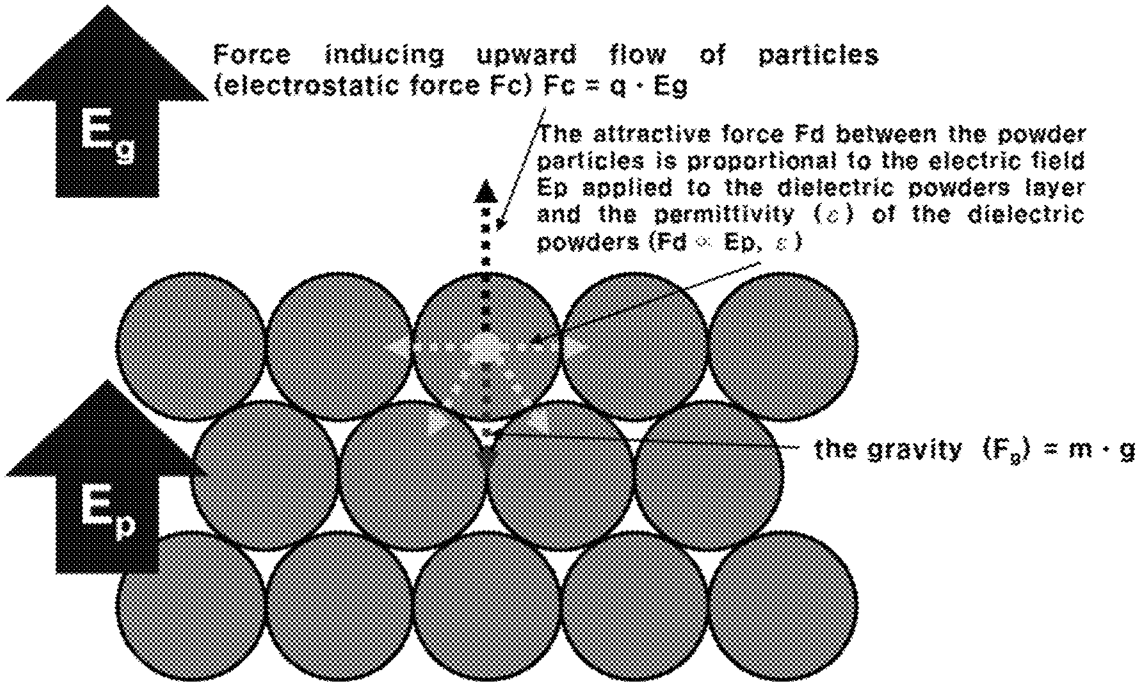
FIG. 2 is a view illustrating a principle in which dielectric powders flow through an apparatus for sorting dielectric powders according to the present disclosure.

FIG. 2 is a view illustrating a principle in which dielectric powders flow through an apparatus for sorting dielectric powders according to the present disclosure.

Referring to FIG. 2, an attractive force $F_d$ may act between the dielectric powders and the gravity $F_g$ may act on the dielectric powders before the electric field is generated in the inner space of the chamber. When the electric field is applied thereto, the electrostatic force $F_c$ in addition to the gravity $F_g$ and the attractive force $F_d$ is applied to the dielectric powders. In this case, when the electrostatic force $F_c$ applied to the dielectric powders is greater than the sum of the gravity $F_g$ and the attractive force $F_d$ ($F_c > F_g + F_d$), the dielectric powders may move upwards under the electrostatic force $F_c$.

The electrostatic force $F_c$ may be determined based on a charge amount q accumulated on the surface of the dielectric powders and the electric field $E_g$ in a gas space on top of the dielectric powders layer ($F_c = q \cdot E_g$). The attractive force $F_d$ between the powder particles is proportional to the electric field $E_p$ applied to the dielectric powders layer and the permittivity (ε) of the dielectric powders ($F_a \propto E_p, \varepsilon$). In this case, since the electric field $E_g$ in the gas space on top of the dielectric powders layer and the electric field $E_p$ applied to the dielectric powders layer may be determined based on the magnitude of the voltage applied from the outside and a shape of the electrode. Thus, the apparatus for sorting the dielectric powder according to the present disclosure may easily sort the dielectric powders by adjusting the magnitude of the voltage to control the magnitude of the force applied to the dielectric powders. In the present disclosure, in addition to the voltage, factors for controlling the flow of the dielectric powders include a frequency, a charge amount q accumulated on the surface of the dielectric powder, and the like.

In the present disclosure, the charge amount q accumulated on the surface of the dielectric powders is the factor that affects the flow characteristics of the dielectric powders to the greatest extent. The charge amount q is most greatly influenced by the surface area (particle diameter and shape), density/permittivity (type of powder) of the dielectric powder, and may be affected by the kind of surrounding gas. When the dielectric powder is lightweight and the surface area thereof is large, the dielectric powders may flow very fast under the external electric field. When the dielectric powder is heavy and the surface area thereof is small, the dielectric powders may slowly flow under the external electric field. In addition, when the dielectric powders have the same weight, one having the spherical shape (the smaller surface area) may flow more slowly than another having the non-spherical shape may. That is, the particle having the non-spherical shape (the larger surface area), for example, the shape of plate-shaped, rod-shaped, cylindrical shape, etc. may flow faster. In the present disclosure, using the difference between the charge amounts of the dielectric powders, the powders may be sorted based on a diameter, shape, density, and permittivity of the particle.

Figure 3:
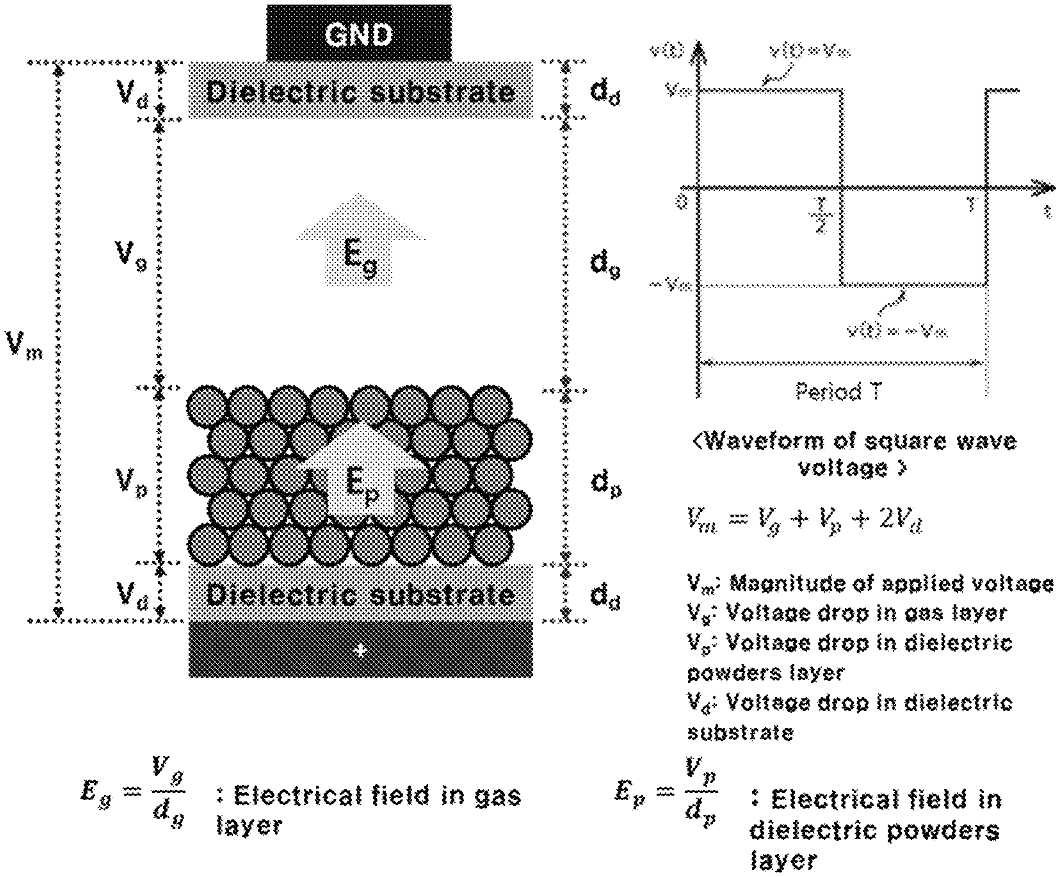
FIG. 3 is a diagram illustrating an AC electric field applied through the dielectric powders sorting apparatus of the present disclosure.

FIG. 3 is a diagram illustrating a voltage applied through the dielectric powders sorting apparatus of the present disclosure.

Referring to FIG. 3, the voltage applied to the dielectric powders sorting apparatus of the present disclosure may be an AC high voltage of one selected from a sine wave, a square wave, a pulse wave, a triangle wave, a sawtooth wave, and the like. Preferably, the voltage may have a square wave. The square wave voltage has a rectangular waveform in which for one cycle, the waveform changes once and returns to an initial state. A time corresponding to one cycle may be defined as a period T, and the number of cycles included for one second may be defined as a frequency f.

In the dielectric powders sorting apparatus of the present disclosure, the applied voltage $V_m$ may be determined based on the sum of the voltage drop $V_g$ in the gas space, the voltage drop $V_p$ in the dielectric powders layer, and the voltage drop $V_d$ of the dielectric substrate ($V_m=V_g+V_p+2V_d$). In this regard, the voltage drop $V_g$ in the gas space and the voltage drop $V_p$ in the dielectric powders layer may affect the electric field $E_g$ in the gas space and the electric field $E_p$ applied to the dielectric powders layer, respectively. The electric field affects the upward flow of the dielectric powder. Thus, the upward flow distance of the dielectric powders may increase when a higher voltage is applied.

Figure 4:
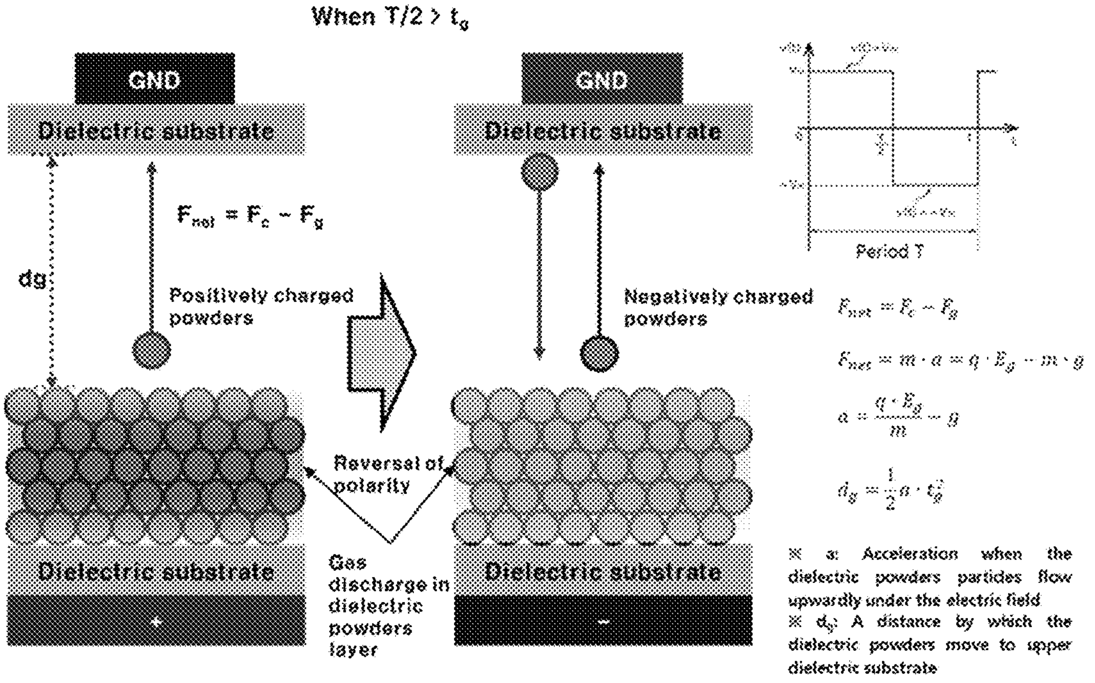
FIG. 4 is a view for illustrating behavior of dielectric powders starting to flow in the dielectric powders sorting apparatus of the present disclosure.

FIG. 4 is a view for illustrating behavior of dielectric powders that starts to flow in the dielectric powders sorting apparatus of the present disclosure.

Referring to FIG. 4, when the electric field of alternating current is generated in the chamber of the sorting apparatus of the present disclosure, a higher electric field may be applied to the inside of the dielectric powders layer than to an outside out of the dielectric powders layer (i.e. the gas space in which the dielectric powders may flow up). Accordingly, the dielectric powders particles may have the electric charges Q generated on the surface thereof, and thus, the electrostatic force $F_c$ enabling the upward flow thereof may be increased. The dielectric powders particles removed from the dielectric powders layer under the high electrostatic force $F_c$ are affected only by the electrostatic force $F_c$ and the gravity $F_g$ except for the attractive force $F_a$ between the dielectric powders. A force $F_{net}$ causing the dielectric powders removed from the dielectric powders layer to flow upwards may be expressed based on a following Equation 1.

$$F_{net} = F_c - F_g \quad \text{Equation 1}$$

$$F_{net} = m \cdot a = q \cdot E_g - m \cdot g$$

$$a = \frac{q \cdot E_g}{m} - g$$

Referring to Equation 1, an acceleration a when the dielectric powders particles flow upwardly under the electric field may be derived based on the force $F_{NET}$ causing the dielectric powders removed from the dielectric powders layer to flow upwardly.

In this regard, when a distance between an upper end of the dielectric powders layer and a lower end of the dielectric substrate, that is, the maximum distance by which the dielectric powders can move in the inner space of the chamber may be defined as $d_g$. A time $T_g$ taken for the dielectric powders to move by the space distance de may be derived using a following Equation 2 and based on the acceleration a and the spatial distance $d_g$.

$$d_g = \frac{1}{2} a \cdot t_g^2, \quad \text{Equation 2}$$

In the present disclosure, when the time $T_g$ taken for the dielectric powders to move by the space distance $d_g$ is smaller than a half period T/2 of the waveform of the voltage, the dielectric powders collide with the lower end of the dielectric substrate, and then drops toward the dielectric powders layer for the half period T/2. According to the present disclosure, using this technical principle, the first and second separation layers may be positioned at suitable positions in the area between the upper electrode and the lower electrode in the inner space of the chamber to sort the dielectric powders.

Figure 5:
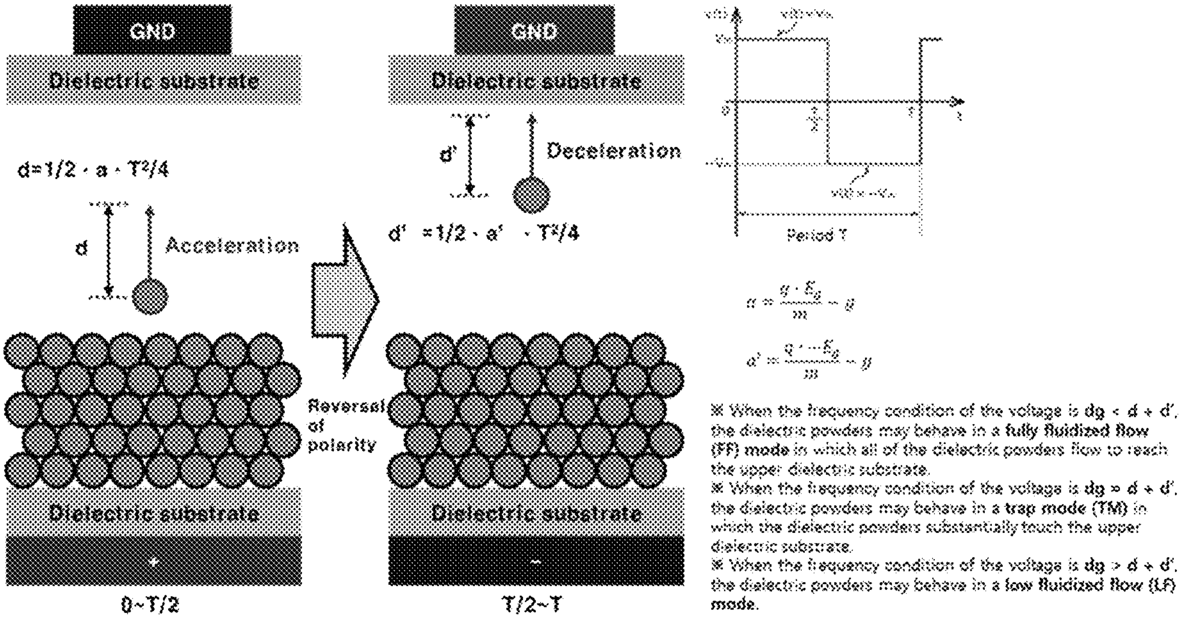
FIG. 5 is a view for illustrating behavior of dielectric powders under an AC electric field in the dielectric powders sorting apparatus of the present disclosure.

FIG. 5 is a view for illustrating behavior of dielectric powders particles under the AC electric field in the dielectric powders sorting apparatus of the present disclosure. ($T/2<t_g$)

Referring to FIG. 5, when the time $T_g$ taken for the dielectric powders to move by the space distance $d_g$ is greater than the half period T/2 of the waveform of the voltage, that is, when the space distance $d_g$ by which the dielectric powders may flow is sufficiently large, and the frequency of the waveform of the voltage is high, the dielectric powders starting to flow may flow upwardly in an accelerated manner by a distance d for one half period (0 to T2) of the waveform of the voltage. Then, when the polarity thereof is reversed, the dielectric powders may flow upwardly in a decelerated manner by a distance d' for the other half period (T2 to T) of the waveform of the voltage. In this regard, when the frequency condition of the voltage is $d_g<d+d'$, the dielectric powders may behave in a fully fluidized flow (FF) mode in which all of the dielectric powders flow to reach the upper dielectric substrate. When the frequency condition of the voltage is $d_g=d+d'$, the dielectric powders may behave in a trap mode (TM) in which the dielectric powders substantially touch the upper dielectric substrate. When the frequency condition of the voltage is $d_g>d+d'$, the dielectric powders may behave in a low fluidized flow (LF) mode. The flow modes will be described with reference to FIG. 6.

Figure 6:
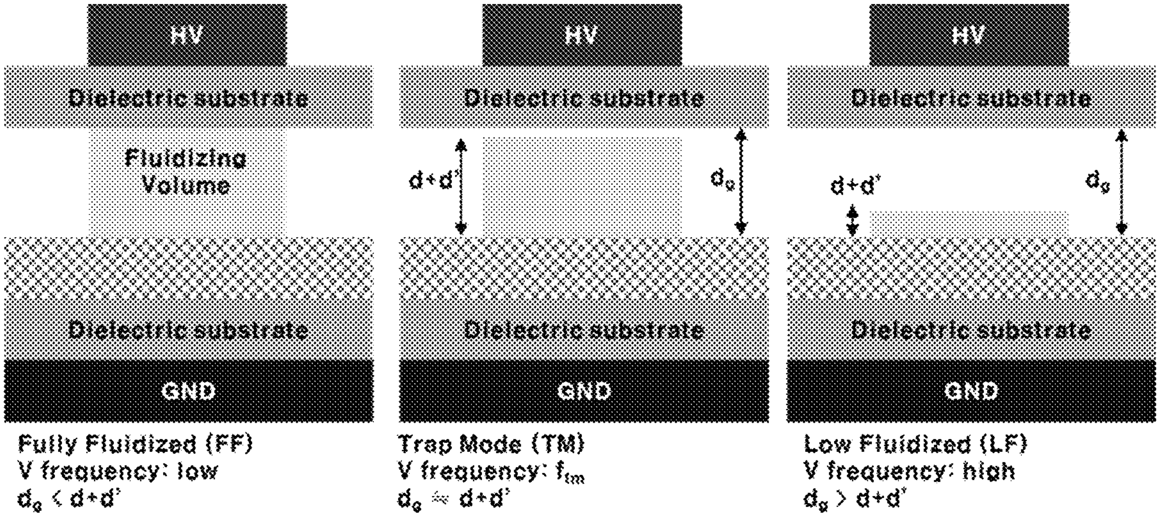
FIG. 6 is a diagram illustrating flow modes FF, TM, and LF of the dielectric powders in the apparatus for sorting the dielectric powders according to the present disclosure.

FIG. 6 is a diagram illustrating the flow modes FF, TM, and LF of the dielectric powders in the apparatus for sorting the dielectric powders according to the present disclosure.

Referring to FIG. 6, according to the present disclosure, the dielectric powders may behave in the three flow modes of FF, TM, and LF using the dielectric powders sorting apparatus. d+d' may be increased according to the increase in the external applied voltage and the increase in the surface area of the dielectric powders particles. d+d' may be decreased according to the increase in each of the frequency of the externally applied voltage, the density of the powder particles, and the permittivity thereof. Therefore, in the dielectric powders sorting apparatus of the present disclosure, the separating means such as the first and second separation layers may be positioned at the position corresponding to $d_g$, and the size of d+d' may be adjusted by controlling the magnitude and frequency of the externally applied voltage, thereby easily sorting the dielectric powders.

Figure 7:
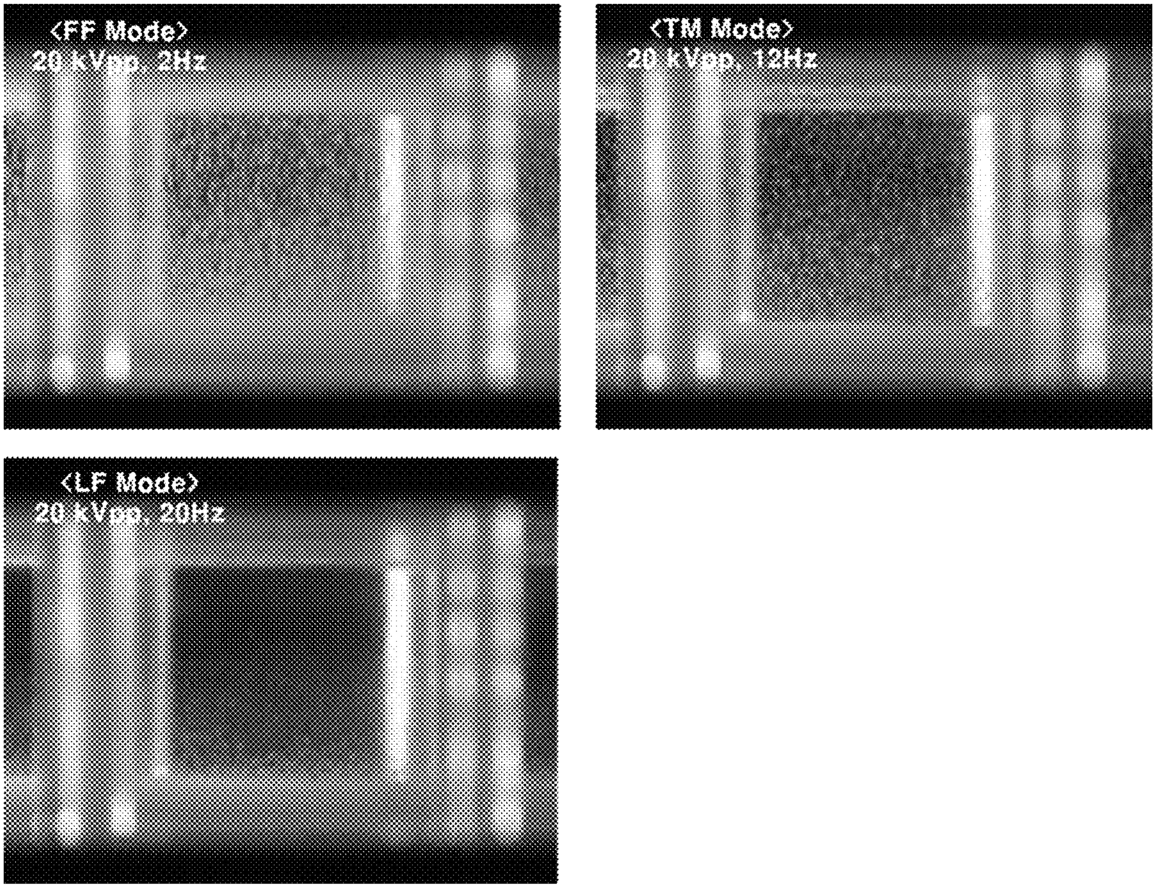
FIG. 7 is an image showing the flow modes FF, TM, and LF of the dielectric powders under application of AC high voltage through the dielectric powders sorting apparatus of the present disclosure.

FIG. 7 is an image showing the flow modes FF, TM, and LF of the dielectric powders in the AC high voltage through the dielectric powders sorting apparatus of the present disclosure.

Referring to FIG. 7, images of the FF, TM, and LF modes as performed using the dielectric powders sorting apparatus of the present disclosure are shown. In the FF mode, a signification portion of the dielectric powders flow upwardly from the lower electrode to the upper electrode. In the TM mode, the dielectric powders flow upwardly from the lower electrode but do not reach the upper electrode and moves to a position closer thereto. However, in the LF mode, the upward flow distance of the dielectric powders is very small.

Hereinafter, the apparatus for sorting the dielectric powders according to the present disclosure will be described in more detail with reference to specific Examples and Comparative Examples. However, Examples of the present disclosure are merely embodiments of the present disclosure, and the scope of the present disclosure is not limited to the following Examples.

EXAMPLES

[Experimental Apparatus]

Figure 8:
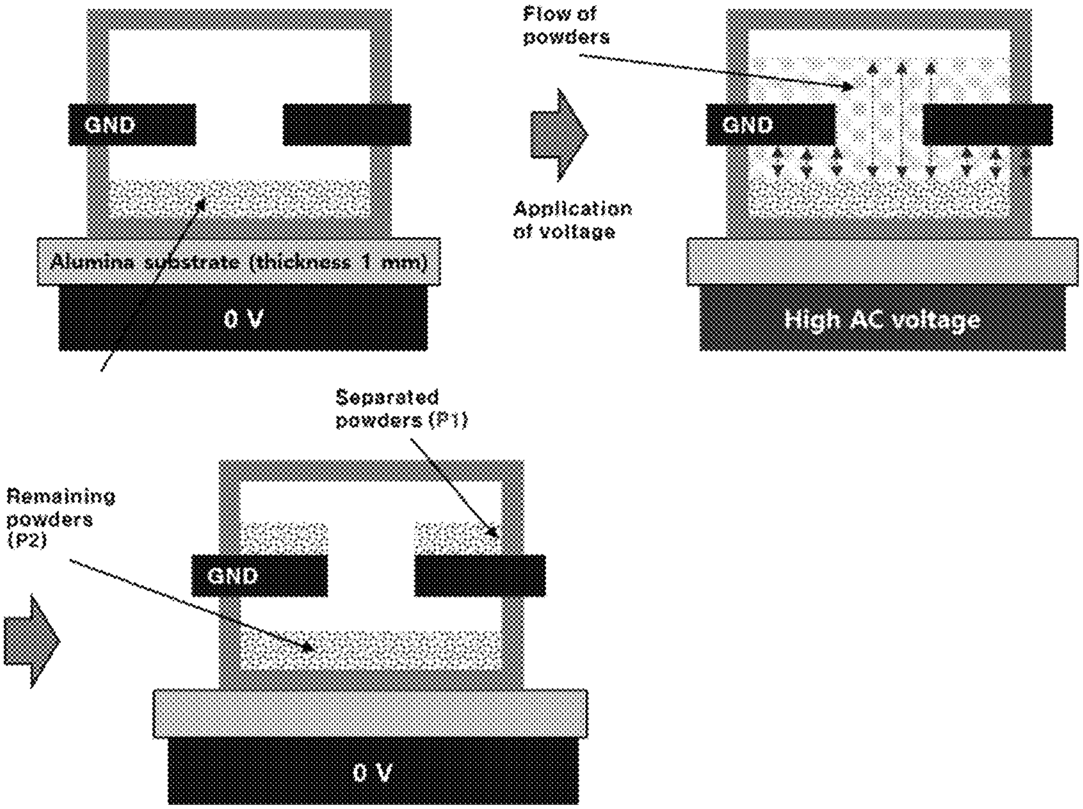
FIG. 8 is a view illustrating the dielectric powders sorting apparatus used in each of Examples 1 to 3 of the present disclosure.

FIG. 8 is a view illustrating the dielectric powders sorting apparatus used in each of Examples 1 to 3 of the present disclosure.

Referring to FIG. 8, the dielectric powders sorting apparatus has a structure including a lower electrode, an alumina substrate having a thickness of about 1 mm and disposed on the lower electrode, and a top electrode GND disposed between an upper end of the main body of the chamber and the alumina substrate. The dielectric powders were placed on the alumina substrate and the upper electrode. An experiment was performed.

[Experimental Conditions]

Experimental conditions using the dielectric powders sorting apparatus are indicted in Table 1 as set forth below.

TABLE 1

| Examples | Voltage (kVpp) | Frequency (Hz) |
|---|---|---|
| Example 1 (A100 + A10 mixed powders) | 20 | 200, 300 |
| Example 2 (A100 + AB100 mixed powders) | 20 | 100 to 500 |
| Example 3 (A100 − AB100 mixed powders) | 14 to 24 | 200 |

*Voltage Applying Means: High Voltage Amplifier and Function Voltage Generator
*Voltage: square wave alternating current
* Voltage Range: 14 to 24 kVpp (Peak th Peak Voltage)
* Voltage frequency range: 100 to 500 Hz
* Discharge gas: Air

Example 1

In Example 1 of the present disclosure, alumina ceramic powders for an abrasive agent having different particle diameters were used. Specifically, a mixture of alumina ceramic powers (A100) having a size of 100 μm and alumina ceramic powers (A10) having a size of 10 μm was used. The frequency was changed to 200 and 300 Hz at a voltage of 20 kVpp to sort the dielectric powders based on the particle size.

Figure 9:
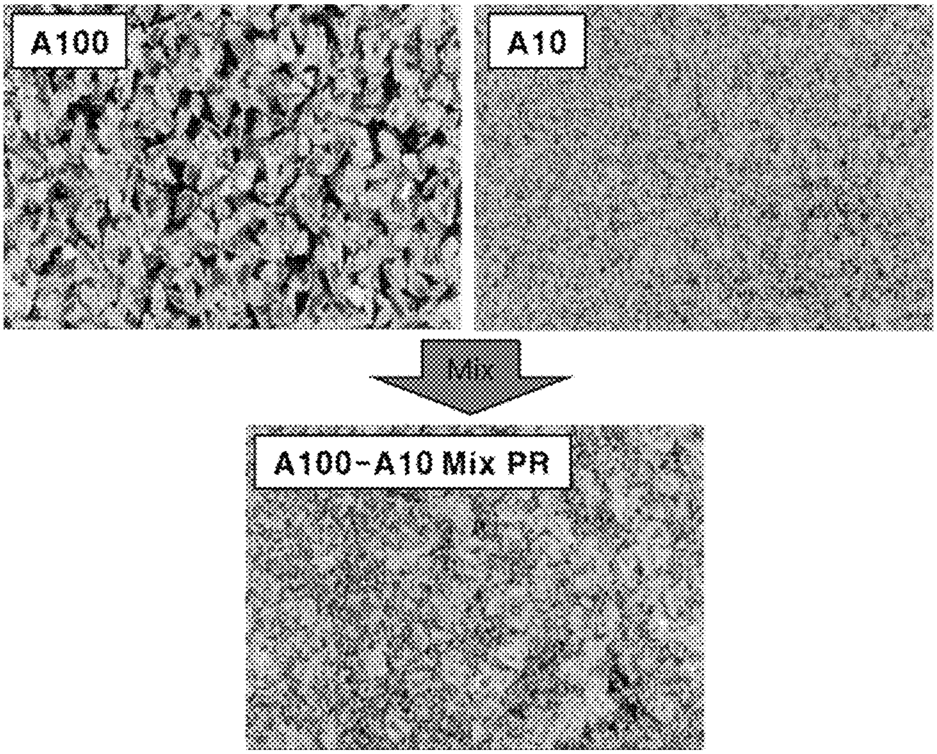
FIG. 9 shows images of the dielectric powders used in Example 1 of the present disclosure.

FIG. 9 shows images of the dielectric powders used in Example 1 of the present disclosure.

Referring to FIG. 9, it may be identified that in the mixed powders used in Example 1 of the present disclosure, A100 and A10 are uniformly mixed with each other.

FIG. 10 shows images of the dielectric powders sorted through Example 1 of the present disclosure.

Referring to FIG. 10, it may be identified that when the powders are sorted under conditions of the voltage 20 kVpp and the frequency 200 Hz, the mixed powders having a higher content of A10 are accumulated on the upper electrode, whereas the mixed powders having a higher content of A100 are accumulated on the alumina substrate. It may be identified that the particles of A100 and A10 are not completely separated from each other under conditions of the voltage 20 kVpp and the frequency 200 Hz. It may be identified that when the dielectric powders are sorted while the magnitude of the voltage is fixed and the frequency is changed to 300 Hz, only the powders of A10 are accumulated on the upper electrode.

The time for which the powder particles rise or fall is shorter as the frequency increases. When a voltage of the same magnitude is applied, and when a lower frequency (200 Hz) is applied, the particle (A100 having the smaller surface area relative to a weight and being heavy) can reach the separation layer. However, when a higher frequency (300 Hz) is applied, only particles that can relatively easily move (A10 having the larger surface area relative to the weight and being light) can reach the separation layer and be sorted. Accordingly, it may be identified that the homogeneous powders may be easily sorted using the dielectric powders sorting apparatus of the present disclosure.

Example 2: Separation of Dielectric Powders Based on Frequency

In Example 2 of the present disclosure, a mixture of alumina ceramic powers (A100) having a size of 100 μm and alumina balls (AB100) having a size of 100 μm was used. The frequency was changed to a value in range of 100 to 500 Hz at a voltage of 20 kVpp to sort the dielectric powders.

Figure 11:
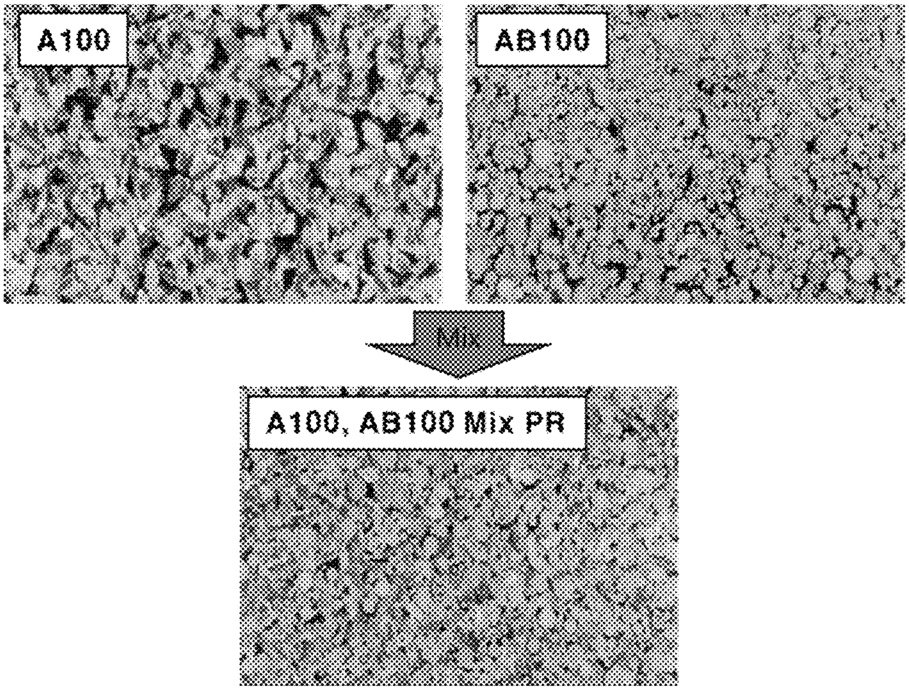
FIG. 11 shows images of the dielectric powders used in Example 2 of the present disclosure.

FIG. 11 shows images of the dielectric powders used in Example 2 of the present disclosure.

Referring to FIG. 11, it may be identified that in the mixed powders used in Example 2 of the present disclosure, A100 and AB100 are uniformly mixed with each other. It may be identified that AB100 is generally spherical and the deviation of the particle diameters thereof is large.

FIGS. 12 and 13 show images of the dielectric powders sorted through Example 2 of the present disclosure.

The powders are sorted under conditions of the voltage 20 kVpp and the frequency in a range of 100 Hz to 500 Hz. Referring to FIGS. 12 and 13, it may be identified that regarding the AB100, particles P1 having a large particle diameter are accumulated on the upper electrode as the frequency decreases from 500 Hz to 100 Hz, while regarding A100, particles P1 having greater sphericity are accumulated thereon as the frequency decreases from 500 Hz to 100 Hz. After terminating the sorting experiment based on the magnitude of the frequency, the powders P2 accumulated on the alumina substrate are checked. In this regard, it may be identified that AB100 particles having a large particle diameter are accumulated thereon.

Thus, it may be identified that the mixed powders having different surface areas may be easily sorted by controlling the frequency in the dielectric powders sorting apparatus of the present disclosure.

Example 3: Separation of Dielectric Powders Based on Magnitude of Voltage

In Example 3 of the present disclosure, the same mixed powder as the mixed powder used in Example 2 was used. The frequency is fixed to 200 Hz and the voltage is changed from 14 to 24 kVpp by 2 kVpp to sort the dielectric powders.

FIGS. 14 and 15 show images of the dielectric powders sorted through Example 3 of the present disclosure.

Referring to FIGS. 14 and 15, the dielectric powders P1 accumulated on the upper electrode are checked. It may be identified that as the magnitude of the applied voltage is increased, AB100 particles having a relatively uniform shape and AB100 particles having a large particle diameter are accumulated on the upper electrode. Further, after terminating the separation experiment based on the magnitude of the voltage, the dielectric powders P2 accumulated on the alumina substrate are checked. In this regard, it may be identified that AB100 particles having a large particle diameter are accumulated thereon.

It may be identified that using the dielectric powders sorting apparatus of the present disclosure, the mixed powders having different surface areas may be easily sorted by controlling the voltage.

Although the present disclosure has been described above with reference to preferred embodiments of the present disclosure, those skilled in the art will appreciate that various modifications and changes may be made to the present disclosure without departing from the spirit and scope of the present disclosure as set forth in the following Claims.

What is claimed is:

1. An apparatus for sorting dielectric powders, the apparatus comprising:

a vertically standing chamber filled with air;

a lower electrode received in an inner space of the chamber;

an upper electrode received in the inner space of the chamber and spaced apart from the lower electrode and disposed at an upper end of the inner space of the chamber;

a first separation layer positioned between the upper electrode and the lower electrode received in the inner space of the chamber, wherein the first separation layer only partially overlaps each of the upper electrode and the lower electrode vertically; and a power applying means configured to apply a bipolar alternating current (+V and −V) to the lower electrode and the upper electrode so that an electric field of the alternating current is generated between the lower electrode and the upper electrode, wherein the apparatus is further configured to control a frequency of the alternating current to secure sufficient upward travel of the dielectric powders for height-based sorting, wherein the dielectric powders are positioned between the lower electrode and the first separation layer, and wherein the dielectric powders are charged dielectric powders, wherein the dielectric powders are sorted based on a sorting criterion including a diameter, a weight, a density, a permittivity, or a surface area of a powder particle, and wherein the apparatus is configured to control each of a magnitude of the voltage and a frequency of the alternating current (AC), based on the sorting criterion.

2. The apparatus for sorting the dielectric powders of claim 1, wherein the apparatus is configured to perform an electrically charging step of electrically charging the dielectric powders before the generation of the electric field of the alternating current.

3. The apparatus for sorting the dielectric powders of claim 2, wherein the electrically charging step includes application of an electric field, irradiation of UV, or generation of plasma for inducing dielectrophoresis of the dielectric powders.

4. The apparatus for sorting the dielectric powders of claim 2, wherein the electrically charging step includes filling the chamber with a first gas and then applying a voltage so that plasma is generated in a dielectric powder layer, and then filling the chamber with a second gas, wherein the first gas has a discharge starting voltage lower than a discharge starting voltage of the second gas.

5. The apparatus for sorting the dielectric powders of claim 1, wherein the apparatus further comprises a second separation layer received in the inner space of the chamber and positioned between the upper electrode and the lower electrode, wherein the second separation layer only partially overlaps each of the upper electrode and the lower electrode, wherein a vertical level of the second separation layer is different from a vertical level of the first separation layer.

6. The apparatus for sorting the dielectric powders of claim 1, wherein the apparatus further comprises a dielectric substrate stacked on an upper surface of the lower electrode.

7. An apparatus for sorting dielectric powders, the apparatus comprising:

a vertically standing chamber filled with air;

a lower electrode received in an inner space of the chamber;

an upper electrode received in the inner space of the chamber, wherein the upper electrode is positioned between an upper end of a main body of the chamber and the lower electrode so as to divide the inner space of the chamber into upper and lower portions, wherein the upper electrode only partially overlaps the lower electrode vertically; and a power applying means configured to apply a bipolar alternating current (+V and −V) to the lower electrode and the upper electrode so that an alternating electric field with periodically reversed directions is generated between the lower electrode and the upper electrode, wherein the apparatus is further configured to control a frequency of the alternating current to secure sufficient vertical oscillation of the dielectric powders for achieving height-based separation, wherein the dielectric powders are positioned between the lower electrode and the upper electrode, wherein the dielectric powders are sorted based on a sorting criterion including a diameter, a weight, a density, a permittivity, or a surface area of a powder particle, and wherein the apparatus is configured to control each of a magnitude of the voltage and a frequency of the alternating current (AC), based on the sorting criterion.

8. The apparatus for sorting the dielectric powders of claim 7, wherein the dielectric powders are charged dielectric powders.

9. The apparatus for sorting the dielectric powders of claim 7, wherein the apparatus is configured to perform an electrically charging step of electrically charging the dielectric powders before the generation of the electric field of the alternating current.

10. The apparatus for sorting the dielectric powders of claim 9, wherein the electrically charging step includes application of an electric field, irradiation of UV, or generation of plasma for inducing dielectrophoresis of the dielectric powders.

11. The apparatus for sorting the dielectric powders of claim 9, wherein the electrically charging step includes filling the chamber with a first gas and then applying a voltage so that plasma is generated in a dielectric powder layer, and then filling the chamber with a second gas, wherein the first gas has a discharge starting voltage lower than a discharge starting voltage of the second gas.

12. The apparatus for sorting the dielectric powders of claim 7, wherein the apparatus further comprises a dielectric substrate spaced apart from the upper electrode and disposed on top of the upper electrode, wherein the dielectric substrate is disposed at an upper end of the inner space of the chamber.

* * * * *